United States Patent [19]

Fischer et al.

[11] Patent Number: 4,974,510
[45] Date of Patent: Dec. 4, 1990

[54] DRIVE FOR MULTI-COLOR ROTARY SHEET PRINTING MACHINE

[75] Inventors: Karlheinz Fischer; Arndt Jentzsch, both of Coswig; Olf Lehmann, Heidenau, all of German Democratic Rep.

[73] Assignee: VEB Kombinat Polygraph "Werner Lamberz Leipzig", Leipzig, German Democratic Rep.

[21] Appl. No.: 439,533

[22] Filed: Nov. 20, 1989

[30] Foreign Application Priority Data

Nov. 18, 1988 [DD] German Democratic Rep. ... 321938

[51] Int. Cl.⁵ .............................................. B41F 5/16
[52] U.S. Cl. ...................................... 101/174; 74/840; 74/409
[58] Field of Search ............... 101/174, 153, 212, 216, 101/219; 74/409, 840

[56] References Cited

U.S. PATENT DOCUMENTS

| 724,997 | 4/1903 | Flora | 101/174 |
|---|---|---|---|
| 2,112,216 | 3/1938 | Wood | 101/174 |
| 2,701,521 | 7/1955 | Taylor | 101/174 |
| 3,151,551 | 10/1964 | Dutro et al. | 101/216 |
| 3,732,813 | 5/1973 | Singh et al. | 101/216 |
| 4,087,169 | 5/1978 | Fantuzzo | 101/216 |
| 4,408,526 | 10/1983 | Mathes | 101/216 |
| 4,759,286 | 7/1988 | Witczak | 101/216 |

*Primary Examiner*—Eugene H. Eickholt
*Attorney, Agent, or Firm*—Michael J. Striker

[57] ABSTRACT

A drive for a printing machine with a plurality of printing mechanisms has a closed gear train arranged to connect the printing mechanisms with each other, a drive train extending parallel to the gear train and elastically connected with the latter by at least two power input points, a torsion spring arranged to be located in a trunnion of each of the printing cylinders, at a drive side of the latter, a bush arranged to be mounted in the trunnion of each of the printing mechanisms, and an axially displaceable driver arranged in the bush and form-lockingly engaging the torsion spring.

5 Claims, 1 Drawing Sheet

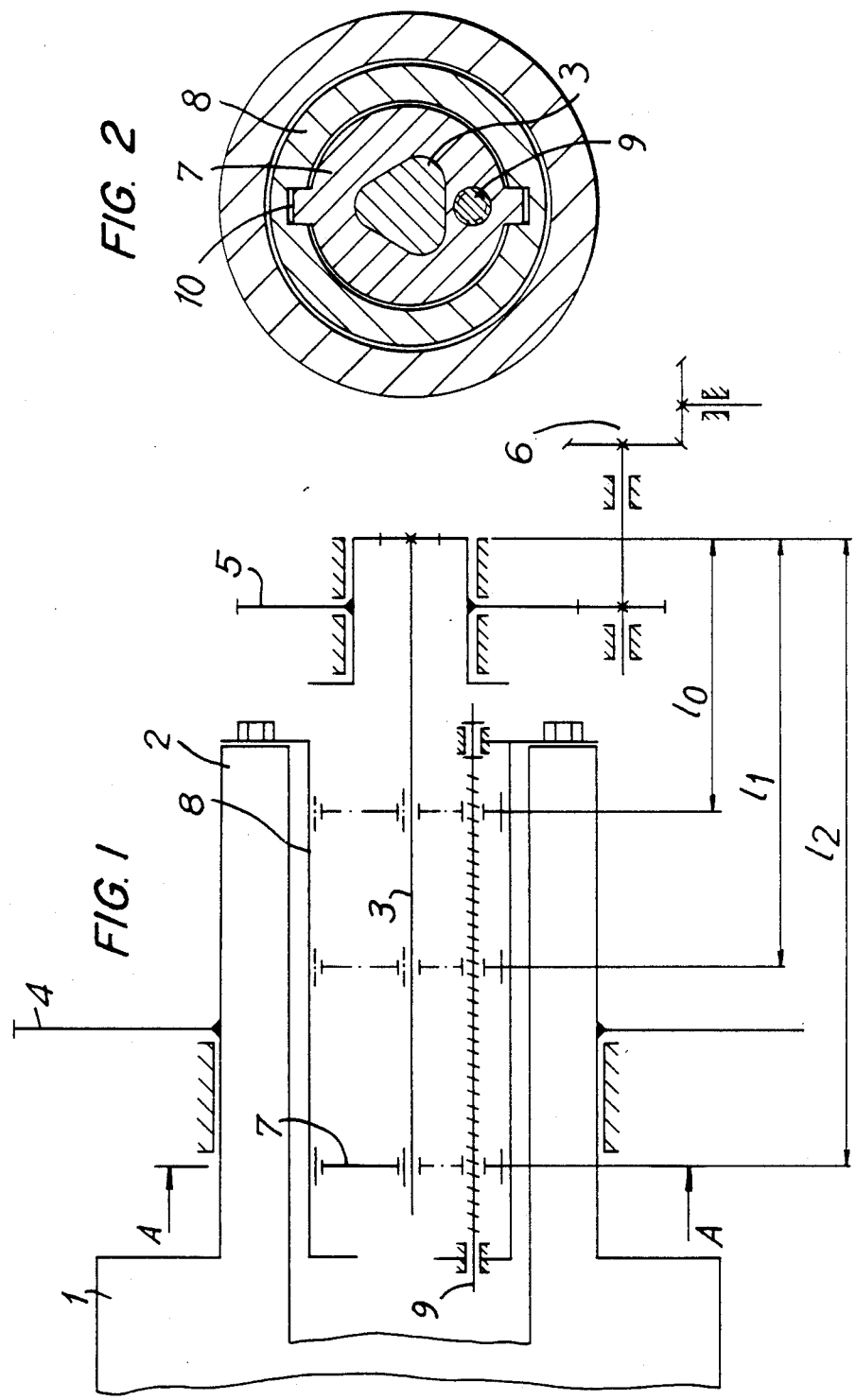

DRIVE FOR MULTI-COLOR ROTARY SHEET PRINTING MACHINE

BACKGROUND OF THE INVENTION

The present invention relates to a drive for a multi-color rotary sheet printing machine.

More particularly, it relates to a drive for such a printing machine, in which the printing mechanisms are connected with one another through a closed gear train which is connected by at least two elastic power input points with a drive train extending parallel to the gear train, while a torsion spring is arranged in each trunnion of the printing cylinder at its drive side.

Drive units of the above mentioned general type are known in the art. It is known to provide torsion springs in the drive of such printing machine for optimal power branching for the purpose of providing a constant definite tooth flank abutment in the gear train and for filtering out the vibrations which can be caused by toothing error or by error during rotation of shafts or gears. This prevents transfer of the vibrations to the cylinders and drums.

In the German document DD-PS No. 140,225 it has been proposed to arrange the torsion spring in the trunnions of the printing cylinder, wherein the spring constant of one torsion spring is greater than the same of other torsion springs. This solution has a disadvantage in that it is necessary to use several different, individually calculated and non-changeable torsion springs for the drive of one multi-color rotary sheet printing machine. These torsion springs are not adjustable to the printing thickness and their support is expensive.

SUMMARY OF THE INVENTION

Accordingly, it is an object of the present invention to provide a drive for a multi-color rotary sheet printing machine, which avoids the disadvantages of the prior art.

More particularly, it is an object of the present invention to provide a drive of the above mentioned general type, having the torsion springs with spring characteristics which can be changed in a simple manner.

In keeping with these objects and with others which will become apparent hereinafter, one feature of the present invention resides, briefly stated, in a drive mechanism for a multi-color rotary sheet printing machine, which has a torsion spring arranged in a trunnion of each of the printing cylinder at a drive side of the latter, a bush arranged in the trunnion of each of the printing cylinder, and an axially displaceable driver arranged in said bush and form-lockingly engaging said torsion spring.

In accordance with another feature of the present invention a spindle is provided for displacing the driver in the bush.

Still a further feature of the present invention is that the torsion spring has a polygonal profile.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic view of a drive of a printing mechanism for a multi-color rotary sheet printing machine in accordance with the present invention; and FIG. 2 is a section taken along the line A—A in FIG. 1.

DESCRIPTION OF A PREFERRED EMBODIMENT

A printing cylinder of printing machine is identified as a whole with reference numeral 1. It has trunnions 2 each accommodating a torsion spring 3.

A toothed wheel 4 is arranged on the trunnion 2 and forms a part of a not shown synchronizing gear train. A drive gear wheel 5 is also arranged on the trunnion 2 and driven from a not shown electric motor. One end of the torsion spring 3 is fixedly clamped in the trunnion 2. The other end of the torsion spring 3 is form-lockingly guided in a driver 7. The driver 7 is displaceable in a bush 8 by rotation of a spindle 9 in the trunnion 2. The bush 8 has guiding grooves 10, in which the driver 7 is axially displaceable.

The positions $1_0$ and $1_1$ identified in dash-dot lines are arbitrary positions of the driver 7. By displacing the driver 7, the springy length of the torsion spring 3 is changed. Thereby a reliable tooth flank abutment and, for the respective printing mechanism, an optimal power branching and an optimal vibration damping can be obtained.

The torsion spring 3 has a throughgoing polygonal profile, for example K-shaped profile which has only a small notch action. Such a design of the torsion spring 3 has an advantage in that, regardless of the number of printing mechanisms only one type of torsion springs is required, which during mounting, repair or in operation can be individually adjusted.

It will be understood that each of the elements described above, or two or more together, may also find a useful application in other types of constructions differing from the types described above.

While the invention has been illustrated and described as embodied in a drive for a multi-color rotary sheet printing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A drive for a printing machine having a plurality of printing mechanisms with printing cylinders, the drive comprising
    a closed gear train arranged to connect the printing mechanisms with each other;
    a drive train extending parallel to said gear train and elastically connected with the latter by at least two power input points;
    a torsion spring arranged to be located in a trunnion of each of the printing cylinders, at a drive side of the latter;

a bush arranged to be mounted in the trunnion of each of the printing cylinders; and an axially displaceable driver arranged in said bush and form-lockingly engaging said torsion spring.

2. A drive for a printing machine as defined in claim 1; further comprising means for axially displacing said drive in said bush.

3. A drive as defined in claim 2, wherein said displacing means includes a spindle operating for displacing said driver in said bush.

4. A drive as defined in claim 1, wherein said torsion spring has a polygonal profile.

5. A printing machine, comprising a plurality of printing mechanisms with printing cylinders; and a drive including a closed gear train connecting said printing mechanisms with each other, a drive train extending parallel to said gear train and elastically connected with the latter by at least two power input points, a torsion spring located in a trunnion of each of said printing cylinders at a drive side of latter, a bush mounted in the trunnion of each of said printing cylinders, and an axially displaceable driver arranged in said bush and form-lockingly engaging said torsion spring.

* * * * *